United States Patent
Bergman et al.

(10) Patent No.: US 8,023,766 B1
(45) Date of Patent: Sep. 20, 2011

(54) METHOD AND SYSTEM OF PROCESSING AN IMAGE CONTAINING UNDESIRABLE PIXELS

(75) Inventors: Ruth Bergman, Haifa (IL); Hila Nachlieli, Haifa (IL); Gitit Ruckenstein, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1080 days.

(21) Appl. No.: 11/799,070

(22) Filed: Apr. 30, 2007

(51) Int. Cl.
*G06K 9/40* (2006.01)
(52) U.S. Cl. ...................................... 382/275; 358/3.26
(58) Field of Classification Search .................. 348/666; 358/3.26; 382/275
See application file for complete search history.

(56) References Cited

U.S. PATENT DOCUMENTS

| | | | |
|---|---|---|---|
| 5,982,946 A | 11/1999 | Murakami | |
| 6,009,209 A * | 12/1999 | Acker et al. | 382/275 |
| 6,393,161 B1 | 5/2002 | Stevenson et al. | |
| 6,614,946 B1 | 9/2003 | Edgar et al. | |
| 6,704,458 B2 * | 3/2004 | Ford | 382/275 |
| 6,731,795 B1 | 5/2004 | Ricard | |
| 7,020,346 B2 | 3/2006 | Dupont et al. | |
| 7,164,496 B2 | 1/2007 | Tatsumi | |
| 2004/0015464 A1 * | 1/2004 | Ii et al. | 706/48 |
| 2006/0226865 A1 * | 10/2006 | Gallarda et al. | 324/770 |
| 2006/0290794 A1 | 12/2006 | Bergman et al. | |

OTHER PUBLICATIONS

Ruth Bergman, Ron Maurer, Hila Nachlieli, Gitit Ruckenstein, Patrick Chase, Darryl Greig, "Comprehensive Solutions for Removal of Dust and Scratches from Images", Feb. 2007.*
"Tutorial: Dust and Scratch Removal With Photoshop" Pixmonix, Downloaded Jun. 1, 2011.*
M. Bertalmio, L. Vese, G. Sapiro and S. Osher. "Simultaneous structure and texture image inpainting", IEEE Transactions on Image Processing. vol12(8), pp. 882-889. Aug. 2003.*
M. Bertalmio, L. Vese, G. Sapiro and S. Osher. "Simultaneous structure and texture image inpainting", IEEE Transactions on Image Processing. vol12(8), pp. 882-889. Aug. 2003.
A Buades, B. Coll and J.M Morel. "A review of image denoising algorithms, with a new one", Multiscale Modeling and Simulation (SIAM interdisciplinary journal). vol. 4 (2), pp. 490-530, 2005.
A.A Efros and T.K. Leung. "Texture Synthesis by Non-parametric Sampling". In Proceedings of IEEE Internal ion Conference on Computer Vision, Sep. 1999.

* cited by examiner

*Primary Examiner* — Gregory F Cunningham (57) ABSTRACT

In a method of processing an image containing undesirable pixels, a coarse identification of a location of the undesirable pixels is received. The coarse identification includes identification of at least one undesirable pixel and at least one desirable pixel in the image. An area in the image to be analyzed for undesirable pixel values is automatically determined according to the coarse identification received. In addition, in the area determined to be analyzed, the pixels are automatically classified as one of undesirable and desirable and the classifications of the pixels are stored.

20 Claims, 7 Drawing Sheets

METHOD AND SYSTEM OF PROCESSING AN IMAGE CONTAINING UNDESIRABLE PIXELS

BACKGROUND

Old photographs often have artifacts, such as, tears, creases, stains, and scratches, due to mishandling, neglect, and deleterious effects generally caused by the environments in which the photographs are stored. Attempts at removing the artifacts are often made by digitally reproducing the old photographs and by employing a digital imaging tool designed to repair the defects.

In addition, photographs often contain other undesirable objects, such as, moles and date stamps, that users would like to remove from the images. As used herein, "undesirable objects" may be considered as referring to the artifacts and/or objects, and "undesirable pixels" may be considered as referring to the pixels forming the artifacts and/or objects, that a user may wish to remove from an image, such as, a photograph.

Conventional computer tools are available to automatically identify some of the undesirable objects and operate by simply identifying anything in the image having a certain characteristic. These conventional computer tools are known, however, to misinterpret the image data and classify actual features in the images as undesirable objects. This often results in smoothing of features in the image as these features are replaced with values computed from average values of pixels around the features. In addition, because these conventional computer tools are often unaware of the actual locations of the undesirable pixels, the conventional computer tools often expend a great deal of time and capacity is seeking for the undesirable pixels.

Other conventional computer tools enable users to manually identify and correct the undesirable pixels in the image. In order to effectively use these computer tools, users are typically required to have a relatively high skill level with respect to the computer tools as well as to be able to precisely determine and apply the correct replacement pixel values for the undesirable pixels. As such, conventional computer tools are difficult to employ and often result in inaccurate replacement pixel values for the undesirable pixels.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and system for processing an image containing undesirable pixels. In accordance with the disclosed method and system, the undesirable pixels are coarsely identified by at least one of a user and a hardware tool configured to coarsely identify the undesirable pixels. In one regard, the coarse identification substantially reduces or eliminates false identification of desirable pixels in the image.

The disclosed method and system further enable undesirable pixels in images to be identified based upon the coarse identification. In one regard, the size and scope of the search for the undesirable object may be limited to an area, which may be selected according to the type of undesirable object being identified, within or around the coarse identification. As such, the amount of time and capacity required to identify the undesirable object may substantially be reduced as compared with conventional automated image correction tools.

Figure 1:
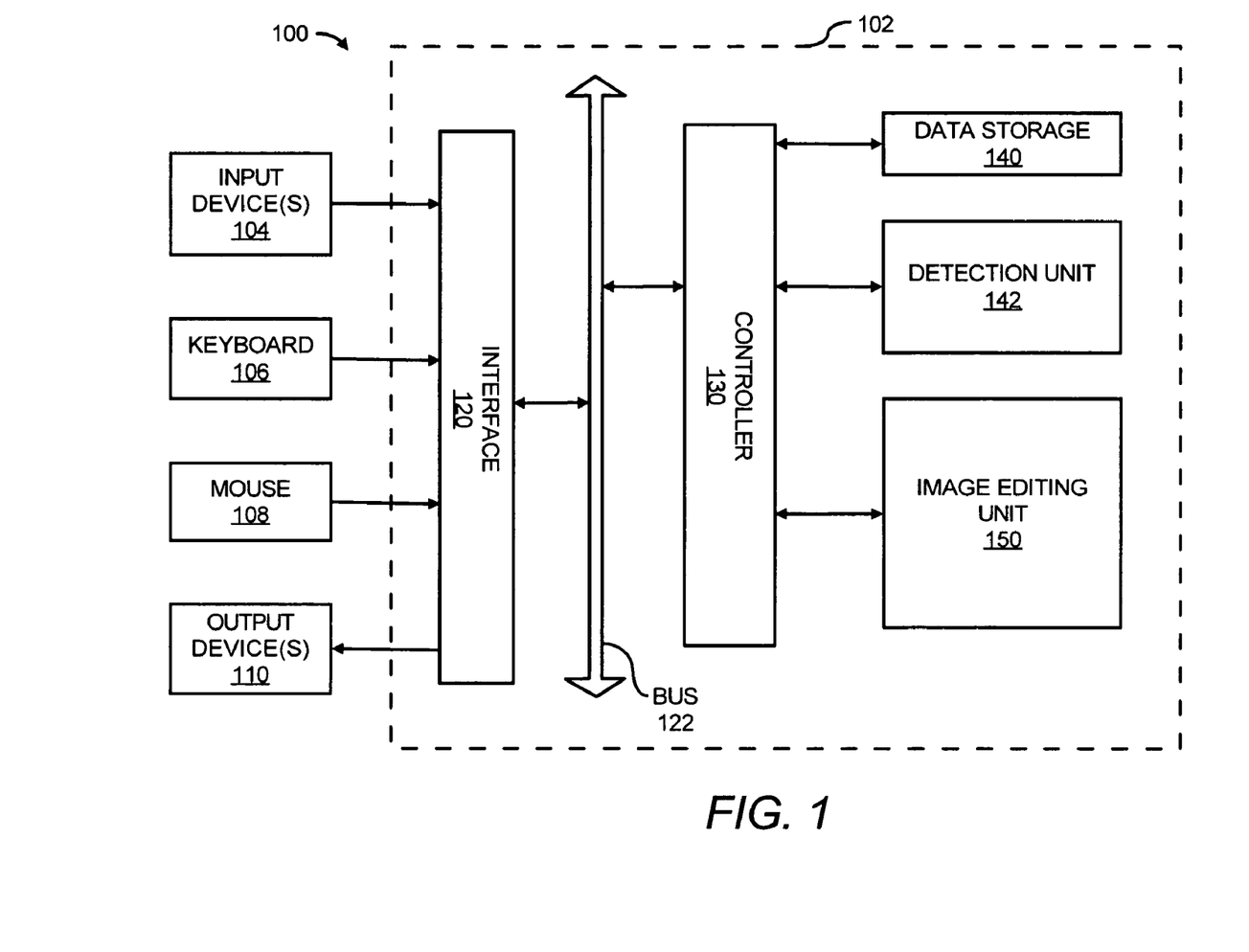
FIG. 1 shows a block diagram of an electronic apparatus configured to implement various image editing operations discussed herein, according to an embodiment of the invention.

With respect first to FIG. 1, there is shown a block diagram 100 of an electronic apparatus 102 configured to implement various image editing operations discussed herein, according to an example. It should be understood that the following description of the electronic apparatus 102 is but one manner of a variety of different manners in which the electronic apparatus 102 may be configured. In addition, it should be understood that the electronic apparatus 102 may include additional components and that some of the components depicted in FIG. 1 may be removed and/or modified without departing from a scope of the electronic apparatus 102. For instance, one or more of the input device(s) 104, the keyboard 106, and the output device(s) 110 may be integrally formed with the electronic apparatus 102.

The electronic apparatus 102 may comprise, for instance, a personal computer, a laptop computer, a portable digital assistant, a printing device, an image capture device, etc. In essence, therefore, the electronic apparatus 102 may comprise a device on which image editing operations may be performed.

As shown in FIG. 1, the electronic apparatus 102 may receive input from one or more input devices 104. The input devices 104, may include, for instance, a scanner, a facsimile machine, a digital camera, a computer, etc. As described in greater detail herein below, the input device(s) 104 may be employed to generate a digital copy of a source image, such as a photograph, in the electronic apparatus 102.

Users may interact with the electronic apparatus 102 through various user input devices, such as, a keyboard 106 and a mouse 108. Although not shown, the electronic apparatus 102 may also receive input through use of a touchpad, a stylus, a touch sensitive screen, voice commands, or through any other reasonably suitable input means. As also described in greater detail herein below, in one example, users may operate a user input device, such as, the keyboard 106, the mouse 108, or other user input device to coarsely identify the locations of undesirable pixels in the scanned image.

As used herein, a "coarse identification" may be defined to include identifications which do not exactly match the undesirable object being identified. Thus, for instance, a "coarse identification" may include a rough outline of at least a portion of the undesirable object, a relatively small mark on or near the undesirable object to identify its location, etc. In addition, a "coarse identification" may include an identification in which desirable pixels are included in the identification. "Desirable pixels" may be defined to include those pixels having values that correctly represent a scene or those pixels that are not considered "undesirable".

As also used herein, "undesirable pixels" may be defined to include, but are not limited to, pixels in the scanned image that are scanned versions of defects in the source image, such as, tears, scratches, creases, etc. "Undesirable pixels" may also be defined to include, but are not limited to, pixels for which a user desires replacement pixel values, such as, moles, scars, time stamps, date stamps, etc.

The electronic apparatus 102 may output data to one or more output devices 110, such as, an electronic display, a printing device, etc. In addition, or alternatively, the output devices 110 may include an interface to a network, such as, an intranet or the Internet, to thus enable data to be communicated to another electronic apparatus over a network. As a further example, an output device 110 may include a removable media drive configured to store data onto removable media, such as, compact discs, digital video discs, SDRAM, magnetic discs, etc.

In one example, users may coarsely identify the locations of undesirable pixels in the scanned image by viewing the scanned image in the output device 110. In another example, the locations of undesirable pixels may be coarsely identified by a hardware tool, such as, an input device 104, configured to use data in addition to the input image data to coarsely identify undesirable pixels in the input image. The hardware tool may comprise, for instance, a scanner containing at least one of an infrared light source and infrared sensors that are employed to generate an additional image. An example of the hardware tool and software associated with the hardware tool are described in U.S. patent application Ser. No. 11/623,697, filed on Jan. 16, 2007 by Patrick J. Chase et al., and entitled "One-Pass Filtering and Infrared-Visible Light Decorrelation To Reduce Noise and Distortions", the disclosure of which is hereby incorporated by reference in its entirety.

The input/output devices 104-110 are depicted as communicating with the electronic apparatus 102 through an interface 120. The interface 120 may comprise any reasonably suitable hardware, software, or combination thereof that enables data to be communicated between the input/output devices 104-110 and the electronic apparatus 102. In any regard, the input/output devices 104-110 and the electronic apparatus 102 are configured to communicate under any reasonably suitable wired and/or wireless protocol through the interface 120.

Signals and data from the input devices 104-108 may be communicated to a controller 130 through a bus 122 of the electronic apparatus 102. The controller 130 is generally configured to receive the input signals and data, to process the input signals and data, and to perform various other processing functions in the electronic apparatus 102. In this regard, the controller 130 may comprise a computing device, for instance, a microprocessor, a micro-controller, an application specific integrated circuit (ASIC), or the like, configured to perform the various processing functions discussed herein. In addition, the controller 130 may comprise processing circuitry configured to perform the various processing functions discussed herein.

According to an example, the controller 130 may receive image data from the input device 104, and may store the image data in a data storage 140. The data storage 140 may include, for instance, volatile or non-volatile memory, such as DRAM, EEPROM, MRAM, flash memory, and the like. The data storage 140 may also include various software or algorithms that provide the functionality of the controller 130, and, in certain instances, may be located remotely from the electronic apparatus 102.

In addition, the controller 130 may invoke or otherwise implement a detection unit 142 configured to accurately identify undesirable pixels in the image based upon the coarse identification of the undesirable pixels. As described in greater detail herein below, the detection unit 142 may generate a map which indicates the locations of the undesirable pixels based upon the coarse identification of the undesirable pixel locations.

Figure 2A:
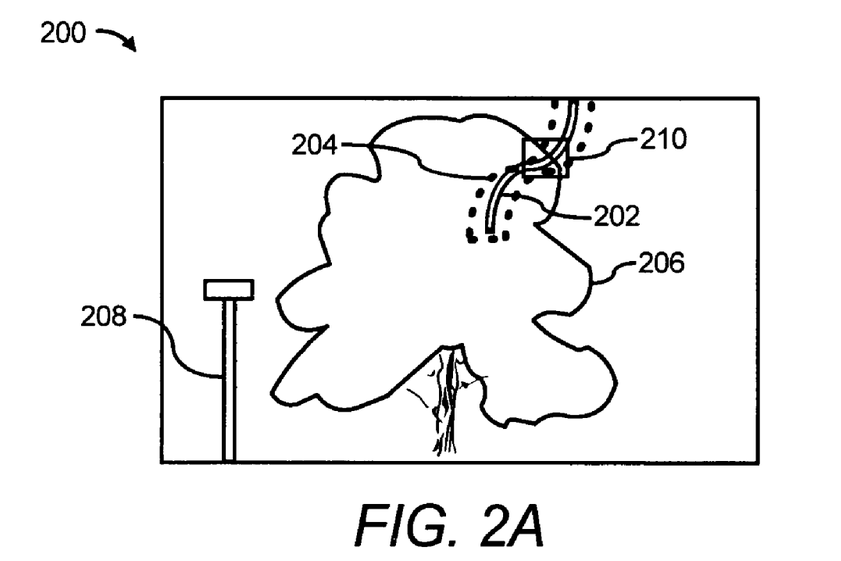
FIG. 2A shows a frontal view of a section of an image to be repaired containing a coarse identification of the undesirable pixels, according to an embodiment of the invention.

With particular reference now to FIG. 2A, there is shown a frontal view of an image 200 containing an undesirable object 202, which has been coarsely identified, according to an example. The image 200 may comprise a scanned digital copy of a source image (not shown), where the source image contains an undesirable object, such as, a tear, scratch, or crease. Alternatively, however, the image 200 may comprise an original digital image or a copy of an original digital image.

Figure 2B:
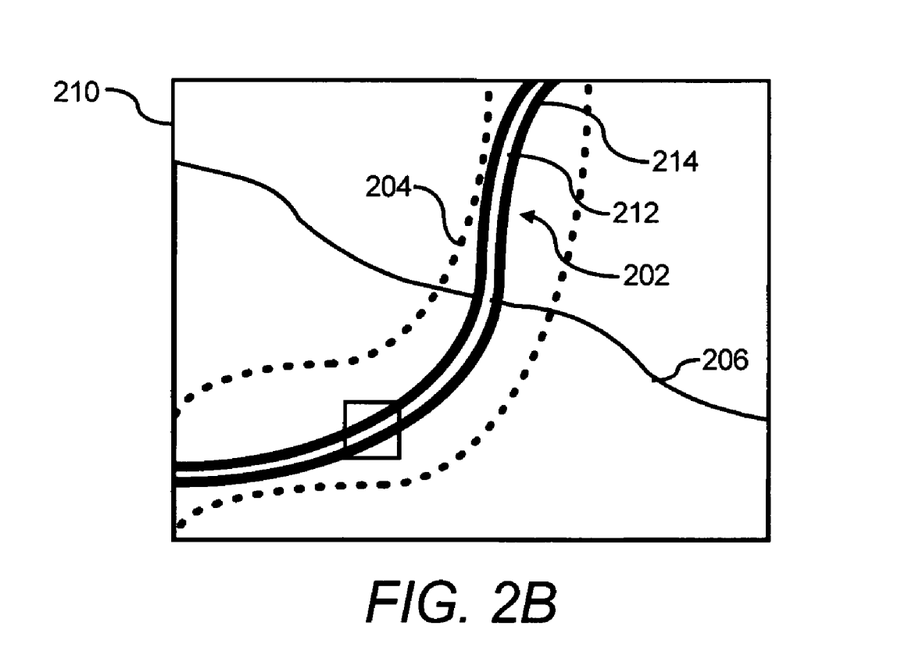
FIG. 2B shows an enlarged frontal view of a section of the image depicted in FIG. 2A, according to an embodiment of the invention.

As shown in FIG. 2A, and more clearly in FIG. 2B, the undesirable object in the source image may appear in the image 200 as a grouping of light defective pixels 212 and dark defective pixels 214. The light defective pixels 212 may comprise, for instance, a reproduction of the white medium on which the source image is printed. In addition, the dark defective pixels 214 may comprise, for instance, shadows of the transition between the white medium and the source image, which often appears when source images having tear defects are scanned.

In FIG. 2A, the coarse identification 204 is depicted as dotted lines around the undesirable object 202. The undesirable object 202 is shown as a relatively large group of connected undesirable pixels, which may occur, for instance, if the medium of a source image from which the image 200 is scanned includes a tear or crease. As discussed in greater detail herein below, the detection unit 142 may identify the undesirable pixels contained in the undesirable object 202 based upon the coarse identification 204.

The image 200 includes a depiction of a tree 206, through which the undesirable object 202 is shown as extending, and a lamp post 208. The lamp post 208 includes a relatively elongated and vertically extending section. In certain instances, conventional computer tools designed to automatically repair images containing undesirable objects may attempt to replace pixel values of the lamp post 208 due to its shape and color. Thus, conventional computer tools may be unable to distinguish between actual features, such as, the lamp post 208, and artifacts, such as, the undesirable object 202, in the image 200. Through the coarse identification 204, however, the detection unit 142 may substantially avoid replacing values of desirable pixels. Various manners in which the detection unit 142 may operate to determine which of the pixels in the image 200 are undesirable and which are desirable are discussed in greater detail herein below.

Figure 2C:
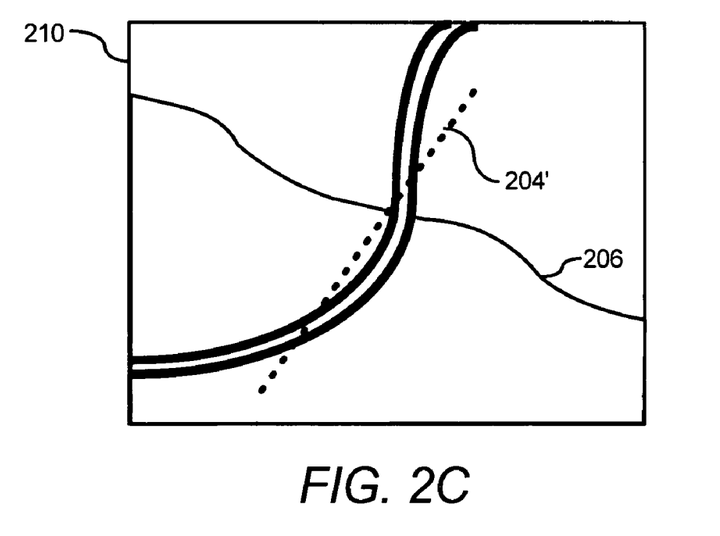
FIG. 2C shows an enlarged top view of a section of the image depicted in FIG. 2A, according to another embodiment of the invention.
Figure 2D:
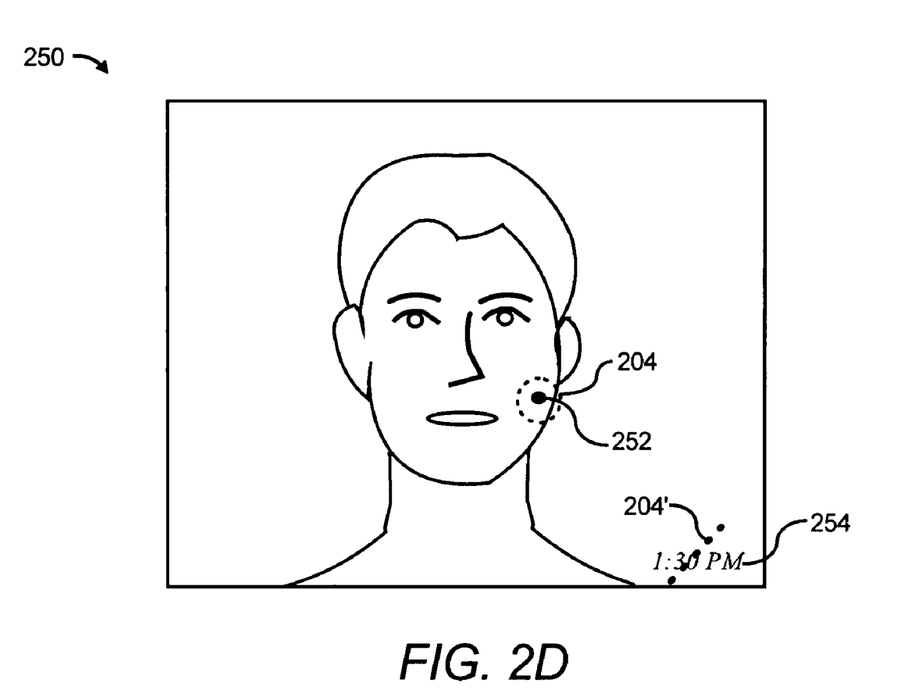
FIG. 2D shows a frontal view of an image to be repaired containing a coarse identification of the undesirable pixels, according to another embodiment of the invention.

With reference now to FIG. 2D, there is shown a frontal view of an image 250 containing undesirable objects 252 and 254, which have been coarsely identified, according to an example. As shown in FIG. 2D, the image 250 may comprise a digital photograph or a digital reproduction of a photograph. The undesirable object 252 is depicted as a mole, but it may also comprise a scar, or other object that a user may wish to remove. In addition, the undesirable object 254 is depicted as a time stamp, but it may also comprise date stamp or other type of indicia.

As also shown in FIG. 2D, the undesirable objects 252 and 254 may be coarsely identified through use of at least one of a coarse identification 204 and 204'. Although the coarse identification 204 has been depicted as identifying a location of the undesirable object 252, the coarse identification 204' may also be used to identify a location the undesirable object 252. Likewise, although the coarse identification 204' has been used to identify a location of the undesirable object 254, the coarse identification 204 may be used to identify a location of the undesirable object 254. Again, various manners in which the detection unit 142 may operate to determine which of the pixels in the image 250 are undesirable and which are desirable are discussed in greater detail herein below.

Once the detection unit 142 has determined which of the pixels are undesirable and which are desirable, the controller 130 may invoke or implement an image editing unit 150 to automatically replace the undesirable pixels in a relatively fast and accurate manner. According to an example, the image editing unit 150 is configured to compute new values for the undesirable pixels and to replace the undesirable pixels with the new pixel values without substantially smoothing features contained in the replacement pixels, as disclosed in co-pending and commonly assigned U.S. patent application Ser. No. 11/796,946, filed on even date herewith and entitled "Automatic Replacement of Undesirable Pixels in an Image", the disclosure of which is hereby incorporated by reference in its entirety.

The detection unit 142 and the image editing unit 150 may comprise hardware components, software modules or combinations thereof. By way of example, either or both of the units 142 and 150 may comprise circuits or computer chips configured to perform their variously described functions. As another example, either or both of the units 142 and 150 may comprise software modules, which the controller 130 may invoke or implement to perform their variously described functions.

In instances where either or both of the units 142 and 150 comprise software modules, the unit(s) 142, 150 comprising software modules may be stored in a memory, such as the data storage 140, accessible by the controller 130. The memory may comprise, for instance, volatile or non-volatile memory, such as DRAM, EEPROM, MRAM, flash memory, and the like. In addition, or alternatively, either or both of the units 142 and 150 comprising software modules may be stored on a removable media, such as, a compact flash memory device, an SD memory device, a floppy disk, a CD-ROM, a DVD-ROM, or other optical or magnetic media.

The functionalities of either or both of the units 142 and 150 may be combined into one unit, without departing from a scope of the electronic apparatus 102. In addition, or alternatively, either or both of the detection unit 142 and the image editing unit 150 may be composed of a plurality of separate units without departing from a scope of the electronic apparatus 102.

Figure 3:
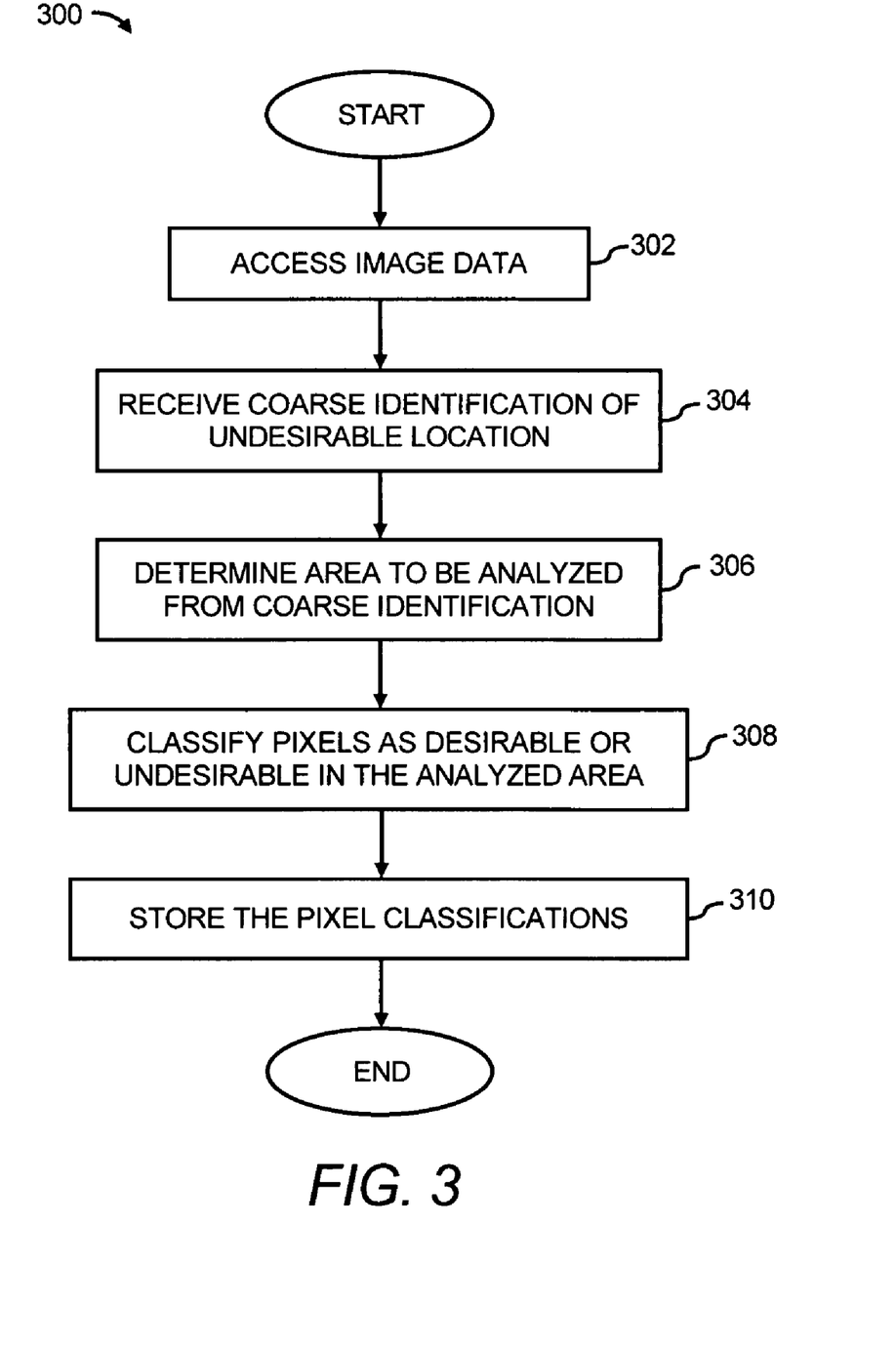
FIG. 3 depicts a flow diagram of a method of processing an image containing undesirable pixels, according to an embodiment of the invention.

Various operations performed by the controller 130, the detection unit 142, and the image editing unit 150 of the electronic apparatus 102 will be described with regard to the flow diagram depicted in FIG. 3. FIG. 3, more particularly, depicts a flow diagram of a method 300 of processing an image containing undesirable pixels, according to an example. It should be understood that the following description of the method 300 is but one manner of a variety of different manners in which such a method 300 may be implemented. In addition, it should be understood that the method 300 may include additional steps and that some of the steps described herein may be removed and/or modified without departing from a scope of the method 300.

The following description of the method 300 is described with particular reference to the components depicted in FIG. 1 and the images 200, 250 depicted in FIGS. 2A-2D. It should, however, be understood that the method 300 may be performed by an electronic apparatus whose components differ from or comprise variations of the components depicted in FIG. 1 and an image that differs from the image 200, without departing from a scope of the method 300.

Generally speaking, an electronic apparatus 102 may implement the method 300 to receive the coarse identification of the location of an undesirable object 202, 252, 254 and automatically determines which of the pixels around or within the coarse identification are undesirable and which of the pixels are desirable. The electronic apparatus 102 may additionally implement a pixel replacement algorithm to replace the undesirable pixels.

At step 302, the controller 130 may implement the detection unit 142 to access an image 200, 250 containing an undesirable object 202, 252, 254. For instance, the detection unit 142 may access the image 200, 250 from the data storage 140. The controller 130 may also display the image 200, 250 on an output device 110, such that the user may visually locate the undesirable object 202, 252, 254 location.

At step 304, the controller 130 receives a coarse identification 204 of the desirable object 202, 252, 254 location. In one example, the coarse identification may be defined, for instance, to include user inputted identifications of an undesirable object 202, 252, 254 that do not exactly match the undesirable object being identified and may thus include a selection of desirable pixels. In another example, the coarse identification may be made by a hardware tool configured to automatically detect and coarsely identify the undesirable pixels, as discussed in the Ser. No. 11/623,697 application for patent.

In the first example above, the controller 130 may receive the user input through user manipulation of an input device, such as, the mouse 108, a touchpad, a stylus, and the like. By way of example, the user may be presented with a computerized tool that enables the user to coarsely identify an area in the image 200, 250 containing the undesirable object 202, 252, 254. In the second example, the controller 130 may receive the input from an input device 104, such as, a scanner comprising either or both of the infrared light source and the infrared sensors.

In addition, the coarse identification 204 may include, for instance, selection of an area that is relatively larger than the undesirable object 202, 252, 254. The relatively larger area may be selected by a rough outline 204 or a highlighting of the undesirable object 202, 252, 254, as shown in FIGS. 2A, 2B, and 2D. The rough outline 204 of the undesirable object 202 may encompass the entire undesirable object 202, 252, 254, or it may include a portion of the undesirable object 202, 252, 254. In addition, or alternatively, the coarse identification may include a relatively smaller identification 204', as shown in FIGS. 2C and 2D.

Through use of either of the coarse identifications 204, 204', the detection unit 142 may accurately distinguish the undesirable object 202, 252, 254 from other objects, such as the lamp post 208 (FIG. 2A), contained in the image 200, 250. As such, the detection unit 142 is configured to substantially avoid wasting unnecessary computing power and time in attempting to locate and repair desirable pixels.

At step 306, the detection unit 142 determines an area in the image 200, 250 to be analyzed based upon the coarse identification 204, 204'. More particularly, for instance, the detection unit 142 may scan a predetermined area either within the coarse identification 204 or within a predetermined area adjacent to the coarse identification 204' for groups of pixels having predetermined values. The selection of the predetermined area to be analyzed may be dependent upon the type of undesirable object 202, 252, 254 being identified, as described in greater detail herein below. In addition, the area to be analyzed may be selected to be substantially smaller than the entire area encompassed by the image 200, 250 to thereby reduce the amount of storage capacity and computing time required to identify the undesirable object 202, 252, 254.

According to a first example, the detection unit 142 may identify an undesirable object 202 caused by the scanning of a tear in the source image, which is shown in greater detail in FIG. 2B. As shown in FIG. 2B, which is an enlarged view of the section 210 in FIG. 2A, a scan of a tear typically yields a relatively long and narrow white strip 212 of pixels surrounded by a relatively long and narrow dark strip 214 of pixels. The relatively long and narrow white strip 212 of pixels is often an image of the medium on which the source image is printed. In addition, the relatively long and narrow dark strip 214 of pixels is often the result of a shadow effect caused during scanning of a tear in the source image. In this regard, the predetermined area may comprise a relatively long area and the predetermined values may be selected to identify groups of pixels that produce structures which are relatively too bright, long, and narrow with respect to their neighboring pixels. In addition, the predetermined values may be selected to identify groups of pixels that produce structures which are relatively too dark, long, and narrow with respect to their neighboring pixels.

According to another example, the detection unit 142 may identify an undesirable object 252, such as a mole or other blemish desired to be removed from an image 250. A mole typically has a substantially circular shape when viewed directly and a substantially oval shape when viewed at an angle. Moles are also typically darker than the skin around the mole. In this regard, the predetermined area may comprise a relatively small, square area and the predetermined values may be selected to identify a group of pixels having values that are relatively darker than their surrounding areas and which form a structure having a substantially circular or oval shape around or within a coarse selection 204, 204'.

According to a further example, the detection unit 142 may identify an undesirable object 254 such as a time stamp or a date stamp which may be added to the source image by an imaging apparatus or during printing of the source image. Time and date stamps are typically included in block letter format and have colors selected to substantially distinguish the time and date stamps from the objects contained in the source image. In this regard, the predetermined area may comprise a relatively square or rectangular area and the predetermined values may be selected to identify a group or groups of pixels that form one or more structures which form block letters and/or have color values that are substantially distinguishable from the pixel values adjacent to the structures around or within a coarse identification 204, 204'.

At step 308, the detection unit 142 classifies each of the pixels in the area to be analyzed as either undesirable or desirable. Various manners in which the detection unit 142 may classify the pixels are described in greater detail herein below.

At step 310, the detection unit 142 may store the pixel classifications in a memory, such as, the data storage 140. In addition, or alternatively, the image editing unit 150 may use the pixel classifications to automatically replace the undesirable pixels with replacement pixels as also described in greater detail herein below.

Figure 4:
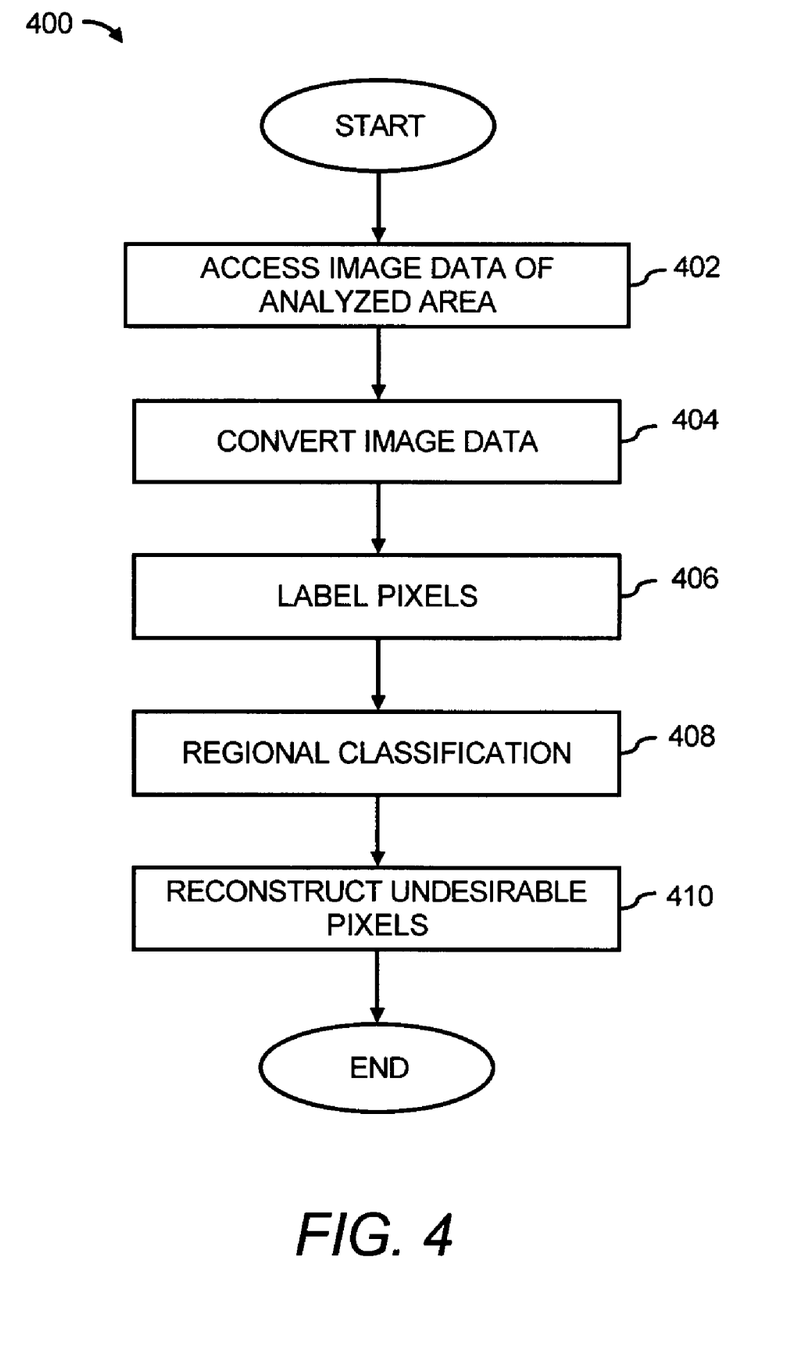
FIG. 4 shows a method of processing image data to classify each of the pixels in an area to be analyzed, according to an embodiment of the invention.

With particular reference first to FIG. 4, there is shown a method 400 of processing image data to classify each of the pixels in the area to analyzed, according to an example. It should be understood that the following description of the method 400 is but one manner of a variety of different manners in which such a method 400 may be implemented. In addition, it should be understood that the method 400 may include additional steps and that some of the steps described herein may be removed and/or modified without departing from a scope of the method 400.

At step 402, the detection unit 142 may access image data pertaining to the analyzed area in the image 200, 250. In one regard, the detection unit 142 may process image data pertaining to a relatively small area in the image 200, 250 instead of the entire image 200, 250, thereby reducing the time and computational capacity required to perform the following steps.

At step 404, the detection unit 142 may convert the image data of the analyzed area from an initial representation or format to another representation or format for further processing. For instance, the image data may include color information and the detection unit 142 may convert the image data from a color representation to a gray representation of the image. The detection unit 142 may use the conversion to substantially reduce the amount of memory used for the processing without significant adverse effects.

One reason for converting the image data to a gray representation is to extract the luminance channel represented by the image data. A relatively simple example of extracting the luminance channel while converting to a gray representation is to take the monochromatic image comprising of the green channel data to be the gray representation. Another conventional example is to convert the image data according to the following formula where p.______ represents the colors of the respective pixels:

$$g=\text{floor}(p.\text{red}*0.299-p.\text{green}*0.587+p.\text{blue}*0.114).$$

According to an example, the detection unit 142 may generate a detail-less image using the gray representation of the image, for instance, by applying a median filter, by performing morphological operations, etc., to thereby remove relatively small and/or narrow details in the gray representation of the image 200, 250. In this regard, the undesirable object 202, 252, 254 may be removed from the detail-less image. The detection unit 142 may thus obtain a "gray-level difference" by subtracting the detail-less image from the gray representation image, and may therefore identify the location of the undesirable object 202, 252, 254 around the coarse identification 204, 204'. Because the detection unit 142 searches for the undesirable object 202, 252, 254 around the coarse identification 204, 204' the detection unit 142 may disregard other areas in the image 200, 250 having high difference values. As such, the detection unit 142 may only need to rely upon the gray-level difference to accurately identify the pixels forming the undesirable object 202, 252, 254.

At step 406, the detection unit 142 may label the pixels contained in the analyzed area. The detection unit 142 may examine the analyzed area pixel-by-pixel and may identify individual ones of the pixels as a candidate (undesirable) or a non-candidate (clean, acceptable or otherwise desirable). In one aspect, the detection unit 142 searches for candidate pixels within the analyzed area which are relatively much lighter or darker than neighboring pixels and accordingly indicative of an artifact, such as an undesirable object 202, 252, 254. The output of step 406 may be a map which indicates the pixels of the analyzed area which are considered to be undesirable and which are desirable. Additional details of a method for implementing step 406 are described below with reference to FIG. 5.

At step 408, the detection unit 142 performs regional classification operations upon the map. Generally speaking, the regional classification operations examine regions of the map and corresponding regions of the image 200, 250 to refine the process of identifying undesirable pixels. In one example, the detection unit 142 uses larger regional considerations of the analyzed area to refine the pixel labeling performed at step 406. More specifically, at least some pixel labeling examples identify high contrast undesirable objects. If the undesirable object is sharp, then the contrast with the background may be sufficient to identify undesirable pixels. However, optics of some devices may blur the edges of a foreign object particularly at higher resolutions and the contrast may not be sufficient to identify undesirable pixels which may remain in the image. If a contour of an undesirable object is not identified, then the undesirable object may be reduced but otherwise remain in the image and be visually unacceptable or mislead subsequent reconstruction operations.

Accordingly, for instance, at step 408, the detection unit 142 may attempt to locate an undesirable object contour by solving a classification problem. During processing at step 408, the undesirable pixels may remain classified as undesirable. However, desirable pixels located near undesirable ones may be relabeled as "don't know" and such pixels are subsequently classified as desirable or undesirable based upon the intensity values of the pixel. The distance used to determine which desirable pixels are to be re-analyzed may be based upon the optical blur of the optics of the device which generated the image data. For example, a distance of 3 pixels may be used in some implementations.

According to an example, an individual one of the pixels labeled "don't know" may be classified using local intensity information of pixels adjacent to the pixel. The adjacent pixels may be in a block or neighborhood about the pixel of interest. For instance, a block of 3 pixels about the pixel of interest may be used. There may be desirable, undesirable and/or "don't know" pixels in the block. In one example, the intensity of the "desirable" and "undesirable" pixels is used to classify the "don't know" pixels using Quadratic Discriminant Analysis (QDA) (that is, 1-dimensional classification). QDA classification assigns individual ones of the "don't know" pixels to the class to which it belongs with the highest likelihood. The classes may be assumed to have a Gaussian distribution and the classification may be implemented using means and variances in one implementation.

In this described regional classification, intensity information of the image data as well as geometric information (for instance, proximity to an undesirable pixel) may be used for the classification. Based upon the similarity of the intensity values between the pixel of interest to pixels labeled desirable or undesirable, the pixel of interest is labeled as desirable or undesirable. Utilization of this exemplary combination of information attains an appropriate balance between finding a low-contrast defect contour and preserving features. The above-described classification has advantages of relatively low computation time although other classification methods may be used in other embodiments.

At step 410, the controller 130 may invoke or implement the image editing unit 150 to access the list of pixels identified as being undesirable and implements reconstruction operations of the undesirable pixels. In addition, the image editing unit 150 replaces the original values of the undesirable pixels with reconstructed or replacement pixel values. Various manners in which the undesirable pixel values may be replaced are described in greater detail herein below.

Following the reconstruction, the revised images including the reconstructed data may be stored, displayed for a user and/or printed.

Figure 5:
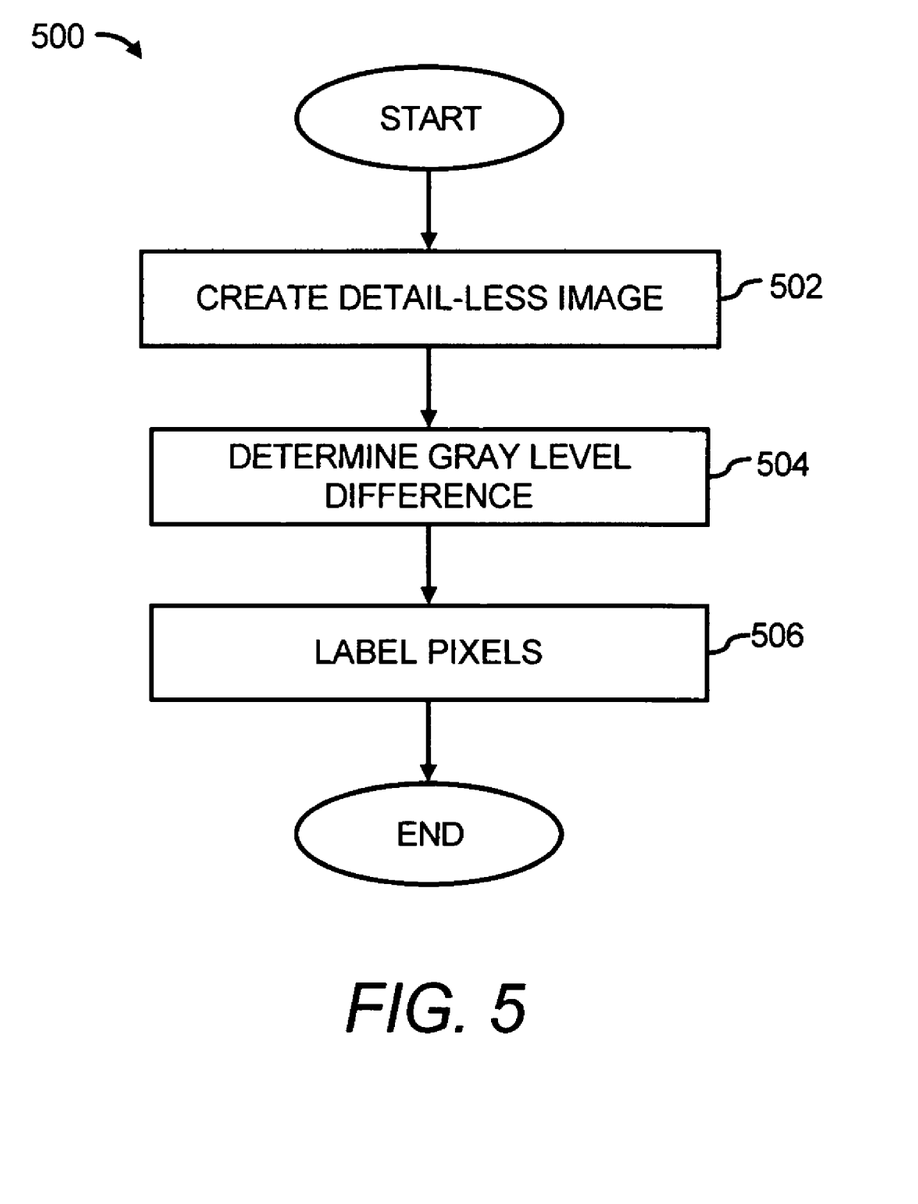
FIG. 5 shows a method of labeling pixels, according to an embodiment of the invention.

Referring now to FIG. 5, there is shown a flow diagram of a method 500 of labeling the pixels, according to an example. In one example, the detection unit 142 is configured to perform the depicted method steps. In addition, the detection unit 142 implementing the method 500 may generate and output a map using the data converted (for instance, gray representation data) at step 404 (FIG. 4). Other methods are possible in other embodiments including more, less and/or alternative steps.

The detection unit 142 searches for pixels which are relatively much lighter or darker than neighboring pixels and may be suspected to be parts of an undesirable object 202, 252, 254. Initially, and as indicated at step 502, the detection unit 142 may create a detail-less image, as described, for instance, at step 404 (FIG. 4). The size of the median filter used to create the detail-less image is a parameter indicating the size of the undesirable object 202, 252, 254. In one example, a median filter may be applied to the gray image created at step 404 by defining a neighborhood or block of pixels (for instance, 5×5) about the pixel of interest and the output is the median value of all pixels in the block.

As described further below, the detection unit 142 may use the gray representation of the image and the detail-less image to compute a measure at each pixel being analyzed. The measure includes a gray-level difference, which indicates how likely the pixel is to be undesirable. It should be understood that the use of the gray representation and the detail-less image discussed herein is merely an example of a manner in which undesirable pixels may be identified. As such, it should be further understood that other local measures may be used and/or required to identify the undesirable pixels.

At step 504, the detection unit 142 accesses converted data of the analyzed area, which may be a gray representation of the data, and the detail-less image created at step 502. The detection unit 142 then determines the gray level difference which, for instance, is a pixel-by-pixel difference between the gray image and the median filtered image. In the described example, the defect type (light versus dark) determines the order between subtraction operands and pixels having relatively high values (for instance, 30) in the gray-level difference measure are generally defective.

At step 506, the output of the gray-level difference analysis, specifically, thresholding, is a map which indicates which pixels in the analyzed area of the image are undesirable and which are desirable. The above-described detection algorithm is performed on individual ones of the pixels and may use small support (for instance, local context is used to determine whether a pixel is undesirable).

In instances where the undesirable pixels result from a tear in the source image, the image editing unit 150 may search for and replace pixel values that are too bright, such as the pixels identified in the relatively long and narrow white strip 212 of pixels prior to searching for and replacing pixel values that are too dark, such as the pixels identified in the relatively long and narrow dark strip 214 of pixels.

According to an example, the undesirable pixels may be labeled and replaced according to the methods described in co-pending and commonly assigned U.S. patent application Ser. No. 11/166,877, filed on Jun. 23, 2005, and entitled "Imaging Systems, Articles of Manufacture, and Imaging Methods", the disclosure of which is hereby incorporated by reference in its entirety.

According to another example, the undesirable pixels may be replaced according to the methods described in co-pending and commonly assigned U.S. patent application Ser. No. 11/796,946, filed on even date herewith and entitled "Automatic Replacement of Undesirable Pixels in an Image", the disclosure of which is hereby incorporated by reference in its entirety.

As described in that application for patent, a replacement pixel value for an undesirable pixel may be determined according to relationships between pixel values in a local neighborhood containing the undesirable pixel and values of pixels contained in secondary neighborhoods. In addition, that application for patent describes manners in which the amount of time and data storage capacity required to identify replacement pixel values and to replace undesirable pixel values with the replacement pixel values may substantially be minimized.

Figure 6:
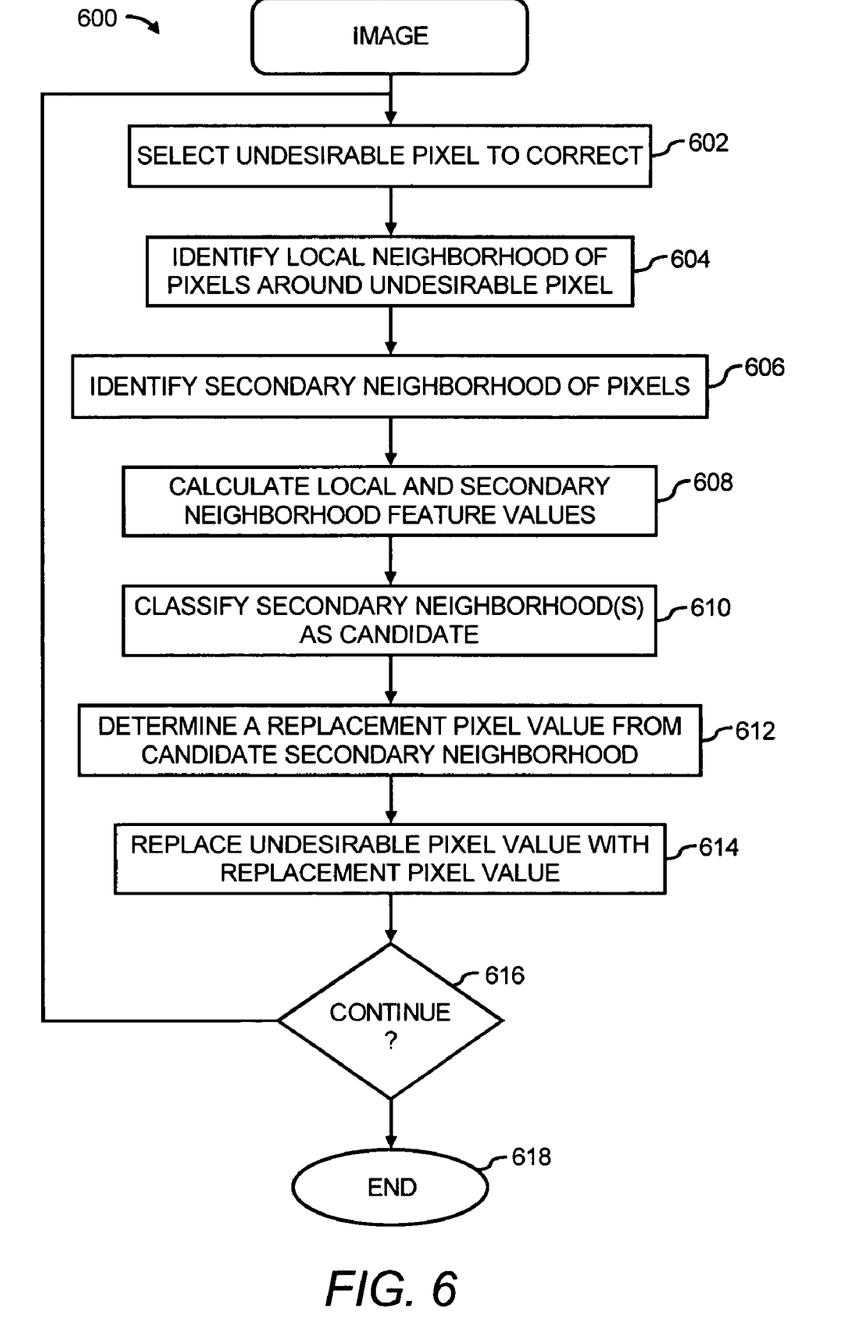
FIG. 6 shows a method of automatically replacing undesirable pixels in an image, according to an embodiment of the invention.

Some of the steps disclosed in that application for patent have been reproduced herein as a method 600 (FIG. 6) of automatically replacing undesirable pixels in an image. As shown in FIG. 6, at step 602, the controller 130 may implement the image editing unit 150 to select an undesirable pixel to replace. The undesirable pixel to be replaced may be selected in a number of various manners. For instance, the undesirable pixel is identified as forming part of a plurality of undesirable pixels identified in a defect/void map developed by the detection unit 142.

In addition, at step 602, of a group of identified undesirable pixels, the image editing unit 150 may select an undesirable pixel that is located at an outermost edge of the group of identified undesirable pixels. As discussed in greater detail herein below, after the undesirable pixel has been replaced, the image editing unit 150 may select an undesirable pixel located at the next outermost edge of the group to replace, and so forth. The replaced outermost pixel may be used in the determination of the replacement pixel value of the undesirable pixel located at the next outermost edge, if suitable. This process may be repeated until all of the undesirable pixels have been replaced.

At step 604, the image editing unit 150 identifies a local neighborhood of pixels around the undesirable pixel. In addition, at step 606, the image editing unit 150 identifies secondary neighborhoods of pixels. The image editing unit 150 may identify secondary neighborhoods such that the secondary neighborhoods do not include the undesirable pixels.

According to an example, the image processing unit 150 may limit identification of the secondary neighborhoods to those pixels contained within a region of the image 200, 250. For instance, the region may be selected to include an area around the undesirable pixel from which the local neighborhood and the secondary neighborhoods may be chosen. The region may therefore be selected to be relatively larger than the local neighborhood and the secondary neighborhoods.

At step 608, feature values of the local neighborhood and each of the secondary neighborhoods are calculated. The feature values may comprise texture descriptors or textural measures of the local neighborhood and each of the secondary neighborhoods. By way of example, the textural measures may include one or more of the mean, the standard deviation, the contrast, the maximum values, and the minimum values of the pixel values in each of the neighborhoods, averages of various sections within each of the neighborhoods, etc.

According to an example, the image editing unit 150 may calculate the feature values of the local neighborhood without factoring values associated with the undesirable pixel. In addition, the image editing unit 150 may calculate the feature values without factoring values associated with other undesirable pixels contained in the local neighborhood. Moreover, the image editing unit 150 may calculate feature values of the secondary neighborhoods without factoring the values of the pixels located at positions corresponding to the locations of the undesirable pixels. Alternatively, however, the image processing unit 150 may calculate the feature values of the secondary neighborhoods 212b-212n while factoring all of the pixels, for instance, when the feature values are pre-computed to substantially increase the speed at which the undesirable pixels are replaced.

At step 610, the image editing unit 150 classifies at least one of the secondary neighborhoods as a candidate from which a replacement pixel value for the undesirable pixel may be determined. According to an example, the image processing unit 150 may consider a secondary neighborhood as being a candidate for pixel value replacement if the secondary neighborhood comprises feature values that are within a predetermined range of the local neighborhood feature value. In one respect, the predetermined range may be selected to remove a substantially large number of secondary neighborhoods and thus pixels, from being considered as candidates for pixel value replacement. By way of example, the predetermined range may be selected such that approximately 10% of the secondary neighborhoods may be considered as candidates for pixel value replacement.

At step 612, the image editing unit 150 may determine a replacement pixel value from at least one of the secondary neighborhoods classified as a candidate for pixel value replacement. In determining the replacement pixel value, the image editing unit 150 may compare the sum of squared differences (SSD) of the respective feature values between the local neighborhood 212a and the secondary neighborhoods 212b-212n. In addition, the values of the undesirable pixels may be omitted from the SSD comparison.

In one example, the image editing unit 150 may compute the replacement pixel value to equal the pixel value corresponding to the secondary neighborhood yielding the lowest SSD value. In this example, therefore, the image editing unit 150 may determine which of the secondary neighborhoods yields the lowest SSD value with the local neighborhood. The image editing unit 150 may then correlate the location of the undesirable pixel in the local neighborhood with a corresponding pixel location in the selected secondary neighborhood. The image editing unit 150 may extract the pixel value of the corresponding pixel location and may select that pixel value as the replacement pixel value for the undesirable pixel.

Although particular reference has been made herein to the computing of the replacement pixel value corresponding to the secondary neighborhood, yielding the lowest SSD value, it should be understood that the replacement pixel value may be computed based upon other distance metrics. Thus, for instance, the replacement pixel value may be computed based upon a sum of absolute differences, a difference in mean values, etc. In addition, the replacement pixel value may be selected as the one that yields the lowest distance level between the local neighborhood and the secondary neighborhoods.

In another example, the image editing unit 150 may compute a weighted average of pixel values in one or more of the candidate secondary neighborhoods that respectively correspond in location to the undesirable pixel in the local neighborhood which is being replaced. The weighting of the average pixel value from a particular secondary neighborhood may be based upon a distance metric of the secondary neighborhood with respect to the local neighborhood. Thus, for instance, the average pixel values from secondary neighborhoods that have lower distance values with respect to the local neighborhood may receive a higher weighting value. In this example, the image editing unit 150 may base the weighting according to the following equation:

$$\bar{q} = \frac{\sum_{p \in C} \exp\left(\frac{-\sum_{i=0}^{K-1} g_i \cdot (p_i - q_i)^2}{h^2}\right) \cdot p_0}{\sum_{p \in C} \exp\left(\frac{-\sum_{i=0}^{K-1} g_i \cdot (p_i - q_i)^2}{h^2}\right)}.$$

Equation (1)

In Equation (1), $Q = q_0, q_1, q_2, \ldots, q_{K-1}$ is the two dimensional neighborhood surrounding the undesirable pixel where K is the number of pixels in the neighborhood and C is the set of candidate neighborhoods. For a neighborhood P in C, P is denoted as $P = p_0, p_1, p_2, \ldots, p_{K-1}$ and let $p_0$ denote the pixel in the neighborhood P corresponding to the undesirable pixel, which is denoted by $q_0$, which may comprise the central pixel in one example. In addition, $G = g_0, g_1, g_2, \ldots, g_{K-1}$ is a Gaussian spatial filter, and h is a real value weight lifter. For an undesirable pixel i in the neighborhood P, the corresponding value of the Gaussian filter $g_i$ is set to 0. As such, the image editing unit 150 may omit the values of the undesirable pixels in implementing Equation (1). Based upon the definitions provided above, the image processing unit 150 may calculate the replacement pixel value ($\bar{q}$) through implementation of Equation (1).

The determination of whether to use the minimum value or the weighted average may depend upon a desired outcome of the undesirable pixel replacement. For instance, the minimum value may regenerate texture relatively better than the weighted average; whereas, the weighted average may generate relatively more natural looking replacements. As such, for instance, the weighted average may be better suited for replacing undesirable pixels in relatively smooth areas. Thus, for instance, the image editing unit 150 may evaluate the level of texture around a undesirable pixel location, for instance, based upon the standard deviation around the undesirable pixel, and determine whether to use the minimum value or the weighted average based upon the texture level.

At step 614, the image editing unit 150 replaces the undesirable pixel value(s) with the replacement pixel value(s) determined at step 612. In addition, at step 616, the image editing unit 150 may determine whether to continue the method 600. The image editing unit 150 may determine that the method 600 is to end at step 618 if there are no further undesirable pixels or if manually discontinued. However, if the method 600 is to proceed, for instance, if there is at least one additional undesirable pixel, the image editing unit 150 may repeat steps 602-614 to automatically replace the undesirable pixel.

In addition, at step 602, if there are multiple undesirable pixels remaining in the image, the image editing unit 150 may select the next outermost undesirable pixel to replace. In addition, the image editing unit 150 may factor the replacement pixel value for the undesirable pixel in calculating the feature values of the neighborhoods at step 608. The image processing unit 150 may not calculate the feature values of the secondary neighborhoods 212b-212n again at step 608 and may instead rely upon the feature values calculated during the first iteration of step 608. In addition, the image processing unit 150 may rely upon the originally calculated feature values and may thus omit calculating the secondary neighborhood 212b-212n feature values during any further iteration of steps 602-614.

In this regard, the replacement pixel value for the undesirable pixel may be used to more accurately determine replacement pixel values for other undesirable pixels. The image editing unit 150 may thus repeat steps 602-616 until all of the undesirable pixels have been replaced, even in situations where the undesirable pixels encompass relatively large sections of the image 200, 250.

As further described in co-pending and commonly assigned U.S. patent application Ser. No. 11/796,946, a number of preprocessing steps may be performed to substantially reduce the time spent in replacing undesirable pixels. According to an example, the image editing unit 150 may employ the preprocessing steps disclosed in that application for patent in replacing the undesirable pixels in the image 200, 250. As disclosed in that application for patent, the preprocessing steps may include, for instance, preprocessing of the secondary neighborhoods according to their respective textural measures prior to classification of the secondary neighborhoods. The preprocessing steps may also include arrangement of the secondary neighborhoods according to a first textural measure and organization of the arranged secondary neighborhoods according to a second textural measure of the secondary neighborhoods.

The operations set forth in the methods 300-600 may be contained as one or more utilities, programs, or subprogram, in any desired computer accessible medium. In addition, the methods 300-600 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of processing an image containing undesirable pixels, said method comprising:
    receiving a coarse identification of a location of the undesirable pixels, wherein the coarse identification includes identification of at least one undesirable pixel and at least one desirable pixel in the image;
    automatically determining, by a computer, an area in the image to be analyzed for undesirable pixel values according to the coarse identification received based upon a shape of the undesirable pixels being identified;
    in the area determined to be analyzed, automatically classifying the pixels as one of undesirable and desirable; and
    storing the classifications of the pixels.

2. The method according to claim 1, wherein automatically determining an area in the image to be analyzed further comprises determining a predetermined area.

3. The method according to claim 1, further comprising:
    automatically repairing the pixels determined to be undesirable by replacing values of the undesirable pixels with replacement pixel values derived from a pixel value of at least one of the pixels determined to be desirable.

4. The method according to claim 1, further comprising:
    identifying a local neighborhood of pixels around an undesirable pixel;
    identifying secondary neighborhoods of pixels;
    calculating feature values of the pixels contained in the local neighborhood and each of the secondary neighborhoods;
    classifying the secondary neighborhoods having feature values within a predetermined range of the local neighborhood feature value as candidates for pixel value replacement;
    determining a replacement pixel value from at least one of the secondary neighborhoods classified as a candidate for pixel value replacement; and
    replacing the undesirable pixel value with the replacement pixel value.

5. The method according to claim 4, wherein calculating a local neighborhood feature value further comprises calculating textural measures of the local neighborhood and wherein calculating feature values of the secondary neighborhoods further comprises calculating textural measures of the secondary neighborhoods, the method further comprising:
    preprocessing the secondary neighborhoods according to their respective textural measures prior to classifying the secondary neighborhoods, wherein preprocessing the secondary neighborhoods further comprises,
        arranging the secondary neighborhoods according to a first textural measure; and
        organizing the arranged secondary neighborhoods according to a second textural measure.

6. The method according to claim 1, wherein the undesirable pixels comprise a digital reproduction of a tear in a source image, said digital reproduction of the tear having light defective pixels and dark defective pixels, said method further comprising:
    automatically determining which of the defective pixels are light defective pixels and which of the defective pixels are dark defective pixels.

7. The method according to claim 6, further comprising:
    automatically repairing the light defective pixels prior to repairing the dark defective pixels.

8. The method according to claim 1, wherein receiving the coarse identification further comprises receiving a coarse identification that substantially encompasses the relatively large group of undesirable pixels.

9. The method according to claim 1, wherein receiving the coarse identification further comprises receiving a coarse identification that is substantially smaller in size than the relatively large group of undesirable pixels.

10. The method according to claim 1, wherein the undesirable pixels comprise a digital reproduction of a mole in a source image, and wherein automatically classifying the pixels as one of undesirable and desirable further comprises:
    automatically determining which of the undesirable pixels form the digital reproduction of the mole by searching the analyzed area for pixel values that are relatively darker than surrounding pixel values and have at least one of a substantially round and oval shape.

11. The method according to claim 1, wherein the undesirable pixels comprise at least one of a time stamp and a date stamp on the image, and wherein automatically classifying the pixels as one of undesirable and desirable further comprises:
    automatically determining which of the undesirable pixels form the at least one of the time stamp and the date stamp by searching the analyzed area for pixel values that together form distinguishable text and have color values that substantially differ from surrounding pixel color values.

12. The method according to claim 1, wherein automatically classifying the pixels further comprises automatically classifying at least one pixel as neither undesirable or desirable, said method further comprising:
    determining whether the at least one pixel is most similar to pixels classified as undesirable or to pixels classified as desirable; and
    classifying the at least one pixel as undesirable if the at least one pixel is most similar to the undesirable pixels and as desirable if the at least one pixel is most similar to the desirable pixels.

13. The method according to claim 1, wherein automatically classifying the pixels further comprises:
    providing plural representations of the image, said plural representations comprising a gray representation and a detail-less representation; and
    comparing the gray representation and the detail-less representation to determine locations of the undesirable pixels.

14. An imaging system comprising:
    a detection unit;
    a data storage; and
    a computerized controller configured to receive a coarse identification of a location of an undesirable object in an image, said coarse identification including identification of at least one undesirable pixel and at least one desirable pixel in the image, wherein the controller is further configured to at least one of invoke and implement the detection unit to determine an area in the image to be analyzed for undesirable pixels according to the received coarse identification and an identification of a shape of the undesirable object to be located, to classify the pixels contained in the area to be analyzed as one of undesirable and desirable, and to store the pixel classifications in the data storage.

15. The imaging system according to claim 14, further comprising:

an image editing unit, wherein the controller is configured to at least one of invoke and implement the image editing unit to repair the pixels determined to be undesirable by replacing values of the undesirable pixels with replacement pixel values derived from a pixel value of at least one of the pixels determined to be desirable.

16. The imaging system according to claim 15, wherein the undesirable object comprises a digital reproduction of a tear in a source image, said digital reproduction of the tear having light defective pixels and dark defective pixels, wherein the detection unit is further configured to determine which of the undesirable pixels are light defective pixels and which of the defective pixels are dark defective pixels, and wherein the image editing unit is further configured to repair the light defective pixels prior to repairing the dark defective pixels.

17. The imaging system according to claim 15, wherein the undesirable object comprises a digital image of a mole, wherein the detection unit is further configured to determine which of the undesirable pixels form the digital reproduction of the mole by searching the analyzed area for pixel values that are relatively darker than surrounding pixel values and have at least one of a substantially round and oval shape, and wherein the image editing unit is further configured to replace values of the undesirable pixels to remove the digital reproduction of the mole.

18. The imaging system according to claim 15, wherein the undesirable object comprises at least one of a time stamp and a date stamp on the image, wherein the defect detection unit is further configured to determine which of the undesirable pixels form the at least one of the time stamp and the date stamp by searching the analyzed area for pixel values that together form distinguishable text and have color values that substantially differ from surrounding pixel color values, and wherein the image editing unit is further configured to replace values of the undesirable pixels to remove the at least one of the time stamp and the date stamp.

19. A non-transitory computer readable storage medium on which is embedded one or more computer programs, said one or more computer programs implementing a method for processing an image containing undesirable pixels, said one or more computer programs comprising computer readable code for:

receiving a coarse identification of a location of the undesirable pixels, wherein the coarse identification includes identification of at least one undesirable pixel and at least one non-defective pixel in the image;

automatically determining an area in the image to be analyzed for undesirable pixel values according to the coarse identification received, wherein the area to be analyzed is further based upon a shape of the undesirable pixels being identified;

in the area determined to be analyzed, automatically classifying the pixels as one of undesirable and desirable; and storing the classifications of the pixels.

20. The computer readable storage medium according to claim 19, said one or more computer programs further comprising computer readable code for:

replacing the pixels determined to be undesirable by replacing values of the undesirable pixels with replacement pixel values derived from a pixel value of at least one of the pixels determined to be desirable.

* * * * *